United States Patent [19]

Berger et al.

[11] Patent Number: 5,795,400
[45] Date of Patent: Aug. 18, 1998

[54] METHOD FOR RECYCLING COOLANT FOR A CUTTING MACHINE

[76] Inventors: Mitchell H. Berger, 4349 Candlewood La., Sylvania, Ohio 43560; Dennis L. Foster, 13054 Andover Dr., Carmel, Ind. 46033; David K. Shaffer, 20690 McCutchenville Pike, Bowling Green, Ohio 43402; Phillip B. Simon, 2517 Pamela, Ann Arbor, Mich. 48103; John D. Wheatley, 2590 E. County Rd., 820 South, Greensburg, Ind. 47240

[21] Appl. No.: 739,613

[22] Filed: Oct. 30, 1996

Related U.S. Application Data

[63] Continuation of Ser. No. 243,574, May 16, 1994, abandoned.

[51] Int. Cl.[6] ............... B08B 3/00; B08B 3/04; C23G 5/00; C23G 5/02
[52] U.S. Cl. ............... 134/10; 134/25.1; 134/26; 134/33; 134/40
[58] Field of Search ............... 134/10, 26, 40, 134/25.1, 18, 33; 62/64

[56] References Cited

U.S. PATENT DOCUMENTS

| 2,999,064 | 9/1961 | Sluhan | 252/34.7 |
|---|---|---|---|
| 3,518,917 | 7/1970 | Sluhan | 90/11 |
| 3,618,707 | 11/1971 | Sluhan | 184/1 E |
| 3,719,598 | 3/1973 | King | 252/33.4 |
| 3,750,847 | 8/1973 | Sluhan | 184/1 E |
| 5,080,721 | 1/1992 | Flanigan et al. | 134/26 |
| 5,248,343 | 9/1993 | Hamilton et al. | 134/10 |
| 5,421,899 | 6/1995 | Hamilton et al. | 134/10 |

OTHER PUBLICATIONS

A Guide to Coolant Management, Master Chemical Corporation The Coolant Management Comapny, 1990, 1–36.

*Primary Examiner*—Zeinab El-Arini
*Attorney, Agent, or Firm*—Gifford, Krass, Groh, Sprinkle, Patmore, Anderson & Citkowski, P.C.

[57] ABSTRACT

In a metalworking process, an aqueous based degreasing solution which is used to clean manufactured parts, is recycled as a component of an aqueous based coolant fluid which is employed in the metalworking process used to fabricate the parts.

10 Claims, 6 Drawing Sheets

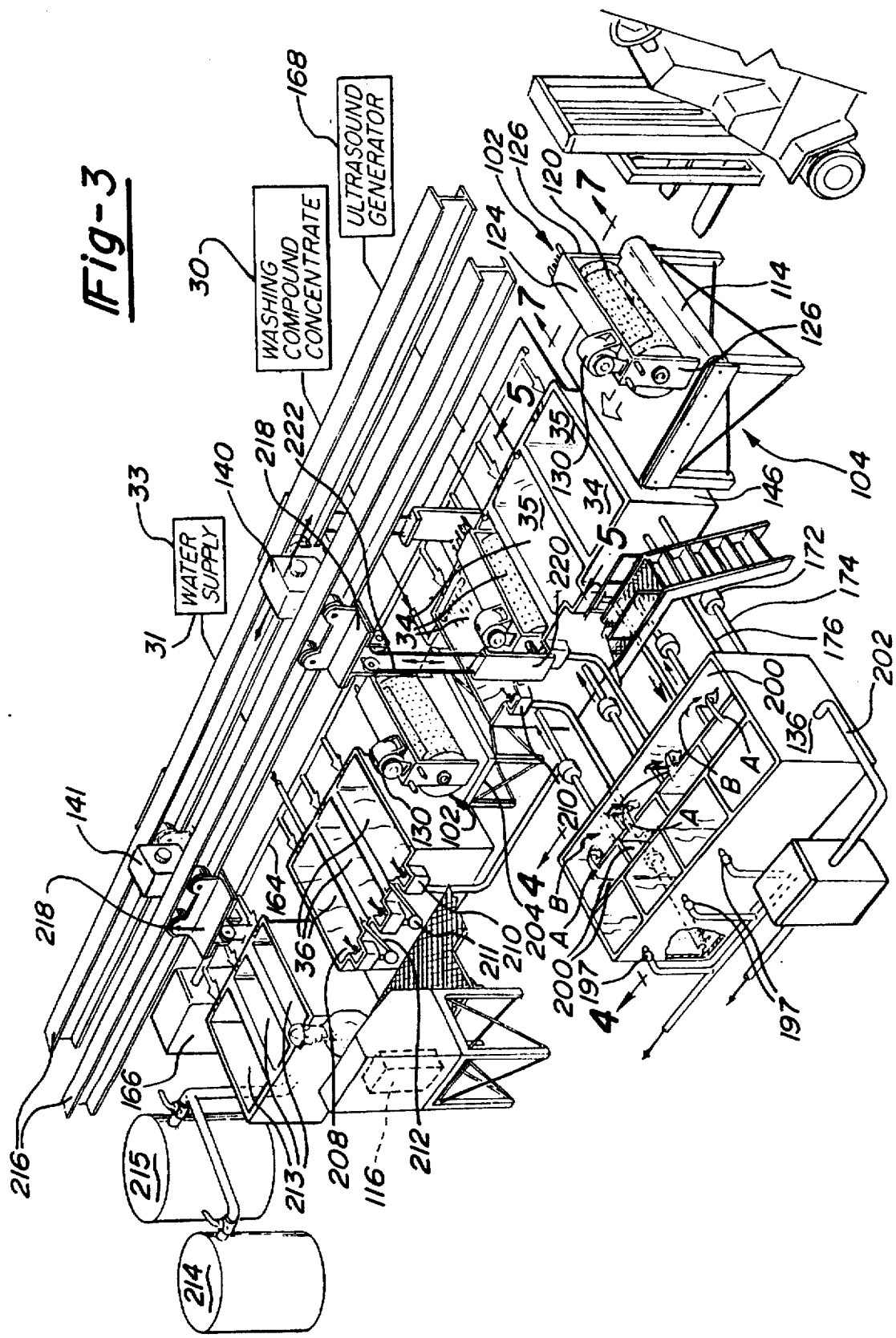

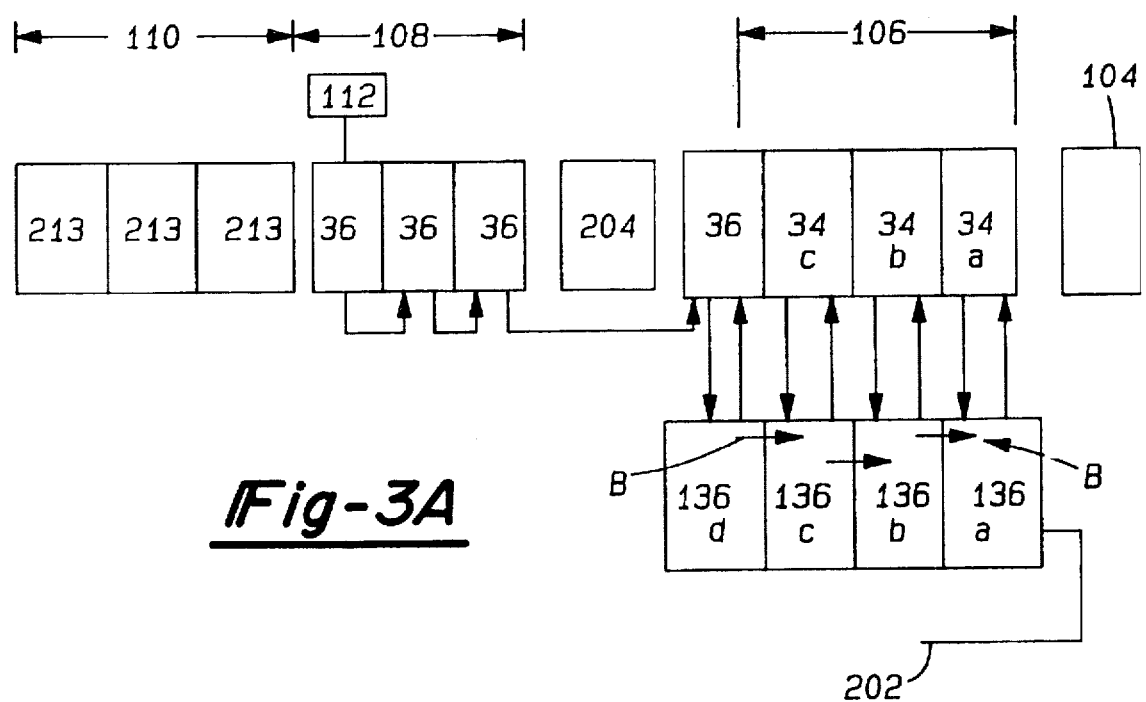

METHOD FOR RECYCLING COOLANT FOR A CUTTING MACHINE

This is a continuation of application Ser. No. 08/243,574 filed on May 16, 1994, and now abandoned.

BACKGROUND OF THE INVENTION

1. Field of the Invention

The present invention relates generally to a method and apparatus of recycling and reusing an aqueous degreasing solution for further use as a component of a coolant solution which is itself recycled and reused in metal cutting machines.

2. Description of the Prior Art

The metal working industry is one of the most heavily regulated industries. One area of this industry that is being scrutinized is the degreasing operation. That is, the metal parts coming out of the cutting machines are covered in metal working fluids and residual lubricants. This occurs because oils are used as lubricants as the raw material metal is cut to form the finished part. Traditionally, heavy, non-soluble oils were used as lubricants. Vapor phase degreasing was the method of choice for the removal of non-soluble oils from the finished parts. Popular vapor phase degreasers are halogenated solvents such as Freon 113; 1, 1, 1-trichloroethane, trichloroethene, methylene chloride, and tetrachlorethene. These first two are suspected ozone depleters, and the remaining three are suspected carcinogens.

With the introduction of lighter, soluble oils as lubricants in the metal cutting industry, the use of aqueous phase degreasers became a possibility. However, because of the fear of corrosion and also the expense of converting from a vapor to an aqueous phase degreasing process, vapor phase degreasing remained the method of choice.

With the advent of new and more stringent environmental regulations, vapor phase degreasing is becoming a disfavored method of cleaning metal parts. This is so because two of the more common vapor phase degreasers are Freon 113 and 1, 1, 1-trichloroethane, substances suspected to deplete the earth's ozone layer. In 1990, Congress passed more stringent laws providing that all parts manufactured by a process involving an ozone depleting substance must be labeled to that effect. This has caused many companies to look to aqueous phase degreasing.

Despite its environmental advantages over vapor phase degreasing with respect to ozone depletion, if not managed properly, aqueous phase degreasing can create environmental problems of its own. The problem of waste water and water pollution is of tremendous concern. As a result, it would be highly desirable for the metal working industry to utilize an aqueous phase degreasing procedure in which the aqueous degreasing solution could be recycled and reused as feeder solution for a metal cutting machine coolant, which is itself recyclable and reusable. Tremendous benefits could be reaped by minimizing worker exposure to harmful substances, as well as reducing or eliminating hazardous waste streams.

SUMMARY OF THE PRESENT INVENTION

A method and apparatus for cooling and washing metal parts which includes washing the metal parts in a degreasing solution, mixing the used degreasing solution with a coolant solution and using the mixture as a coolant in a metal forming operation is disclosed. In this way the wash solution is recycled and reused. The apparatus includes a wash station, rinse station and drying station through which the parts are moved sequentially. The apparatus further includes a counterflow of fluid beginning in the rinse tank and moving downstream through the wash tank at a predetermined rate. The used wash solution is collected for recycling. Also disclosed is a skimming operation and a method of separating degreasing solution from the coolant mixture for recycling in the degreasing system. The method includes using ultrafiltration and precipitation to separate the components.

BRIEF DESCRIPTION OF THE DRAWINGS

A better understanding of the present invention will be seen upon reference to the following detailed description, when read in conjunction with the accompanying drawings, wherein like reference numerals refer to like parts throughout the several views, and in which:

FIG. 3 is a perspective view of the degreasing system in accordance with the invention;

FIG. 3A is a schematic view of the degreasing system according to the invention;

DETAILED DESCRIPTION OF A PREFERRED EMBODIMENT OF THE PRESENT INVENTION

Figure 1:
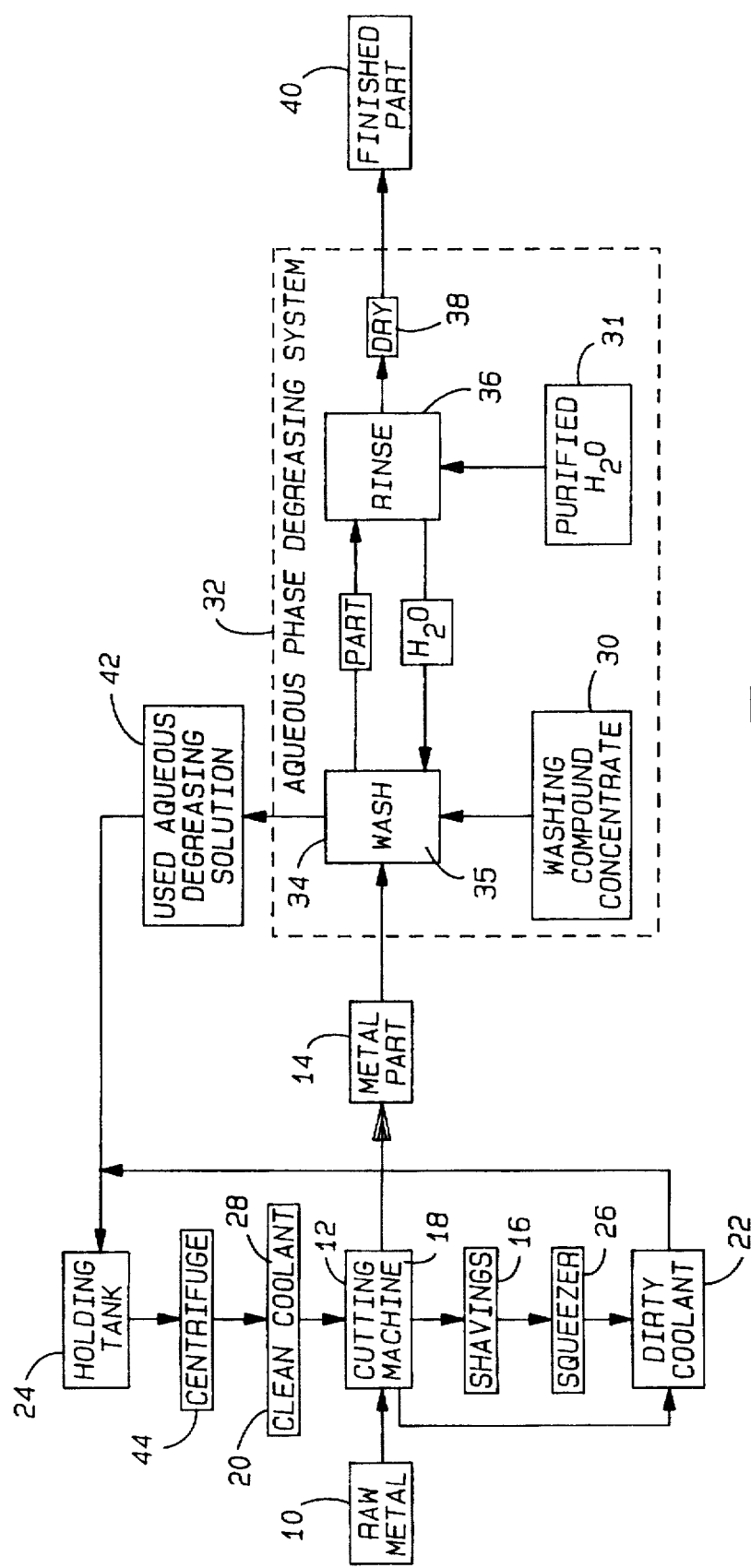
FIG. 1 is a block diagram setting forth the steps in the process of recycling and reusing an aqueous degreasing solution into a coolant solution.

With reference first to FIG. 1, a block diagram of a process in which used degreasing solution is recycled and reused in a coolant solution for metal cutting machines, which is itself recycled and reused, is thereshown. Raw metal 10 is sent to a cutting machine 12 to be cut into formed metal parts 14. The formed part 14 exits the cutting machine 12 on a conveyor belt (not shown). Metal shavings 16 accumulated during the cutting process exit off a second conveyor belt (not shown). Both the formed metal parts 14 and the metal shavings 16 are covered in lubricating oils 18 and coolant solution 20 as a part of the metal cutting process.

The coolant solution 20 that is utilized in the cutting machines 12 contains approximately 2–7% by volume water miscible cutting and grinding fluid concentrate 28 (Masterline Brass Cut available from Master Chemical Corporation in Perrysburg, Ohio), approximately 1–2% water miscible washing compound concentrate 30 (Masterline Brass Clear available from Master Chemical Corporation in Perrysburg, Ohio), and the balance purified water. The water miscible washing compound concentrate 30 causes excessive foaming within the cutting machine 12 at a concentration above 2%. All of the water miscible washing compound concentrate 30 that is used in the coolant solution 20 is taken from the aqueous phase degreasing system 32.

The water miscible washing compound concentrate 30 contains 40–50% by weight amine carboxylate, 10–20% nonionic surfactant, 1–10% pine oil, less than 1% glycol, less than 1% substituted indole, and the balance water. The amine carboxylate is formed by dissolving a carboxylic acid in an excess of amine. The substituted indole is preferably a substituted triazole.

The water miscible cutting and grinding fluid concentrate 28 contains 60–70% by weight petroleum oil, 20–30% petroleum sulfonate, 1–10% nonionic surfactant, 1–10% aromatic alcohol, 1–10% propylene glycol ether, less than 1% propylene glycol, less than 1% substituted indole, less than 1% carboxylic acid, less than 1% blue-green dye, less than 1% silicone defoamer, and the balance water. The aromatic alcohol is preferably a halogen substituted aromatic alcohol. The substituted indole is preferably a substituted triazole.

In the present embodiment, the water miscible washing compound concentrate 30 has the following composition (% w/w): 33.000 water; 0.300 tolytriazole (35% solution); 2.200 oleic acid; 0.0200 siloxane antifoam; 50.980 triethanol amine (99.9%); 12.500 nonylphenol ethoxylate (5 mole wt); 1.000 α-terpineol.

The water miscible cutting and grinding fluid concentrate has the following composition (% w/w): 65.725 naphthenic oil (100 SUS); 18.000 sodium petroleum sulfonate w/ pine oil and glycol; 5.00 water; 4.20 nonylphenol ethoxylate (10 mole wt); 2.50 ethylene oxide/propylene oxide copolymer (mw~332); 2.00 p-chloro-m-cresol; 1.00 tripropyleneglycol monoethylether; 0.600 tolytriazole (35% soln); 0.300 oleic acid; 0.300 phosphate ester (RP Ant LB 400); 0.275 potassium hydroxide (50% soln); 0.100 siloxane antifoam.

In the course of running the metal cutting machine 12, the coolant solution 20 becomes mixed with tramp oils, dirt, and metal shavings 16. This dirty coolant 22 is collected from the cutting machines 12 into a holding tank 24. At the same time, the metal shavings 16 coming off the conveyor are collected and sent through a squeezer 26 to squeeze off the dirty coolant 22. This dirty coolant 22 from the metal shavings 16 is also sent to the holding tank 24.

The metal parts 14 covered with oils and coolant solution 20 are taken from the cutting machines 12 and sent through an aqueous phase degreasing system 32 to be discussed more fully below. The parts 14 are immersed in a series of wash baths or tanks 34 at approximately 160° F. containing approximately 2–6% of the water miscible washing compound concentrate 30 and the balance chemically purified water 31, forming an aqueous degreasing or wash solution 35. The parts are then immersed in a series of purified water rinse baths 36, sent through a dryer 38, and then sent off for further use in manufacturing operations or as finished parts 40. Oils coming off the parts 14 during washing are skimmed off the tops of the wash baths 34, and the used aqueous degreasing solution 42 is collected off of a wash bath 34 and sent to the dirty coolant holding tank 24 where it becomes a feeder solution for the coolant solution 20. The entire aqueous phase degreasing system 32 is controlled so that the used aqueous degreasing solution 42 can be collected from a wash bath 34 at a rate sufficient to permit total use of the used aqueous degreasing solution 42 in the coolant solution 20. In a preferred embodiment, the used aqueous degreasing solution 42 is collected from a single wash bath 32 at a rate of ½ gallon/minute, with 100% of the used aqueous degreasing solution 42 being recycled and reused as a feeder solution for the dirty coolant 22. None of the used aqueous degreasing solution 42 is sent out as waste.

The dirty coolant 22 which has been gathered into a holding tank 24 from the metal cutting machines 12, the squeezed metal shavings 16, and the wash baths 34 of the aqueous phase degreasing system 32 is then sent through a high speed disc bowl centrifuge 44 where the contaminating tramp oils and other contaminants are "spun out." This cleaned and recycled coolant solution 20 is then sent to a clean coolant reservoir 48 (FIG. 2) where the proper concentrations of water and water miscible washing compound concentrate 30 are maintained prior to introduction of the clean coolant solution 20 back into the metal cutting machines 12.

Because all of the used aqueous degreasing solution 42 from the aqueous phase degreasing system 32 is being reused as feeder solution for the dirty coolant 22, problems can arise with the cutting machines 12 if the level of water miscible washing compound concentrate 30 from the used aqueous degreasing solution 42 becomes too high in the coolant solution 20 introduced back into the cutting machines 12. One problem that results is foaming within the metal cutting machine 12, and the other problem that results is elevated concentrations of the metals being machined in the coolant solution 20. The metal contaminants build up in the used aqueous degreasing solution 42 as a natural outcome of cutting and washing the metal parts 14.

The used aqueous degreasing solution 42 (along with the metal contaminants) is then added into the holding tank 24 along with the other dirty coolant 22 that has been collected. Centrifugation 44 only removes dirt and tramp oil from the dirty coolant 22. One way to control the concentrations of metal contaminants and water miscible washing compound concentrate 30 in the coolant solution 20 that is sent back to the cutting machines 12 is through ultrafiltration 50.

Figure 2:
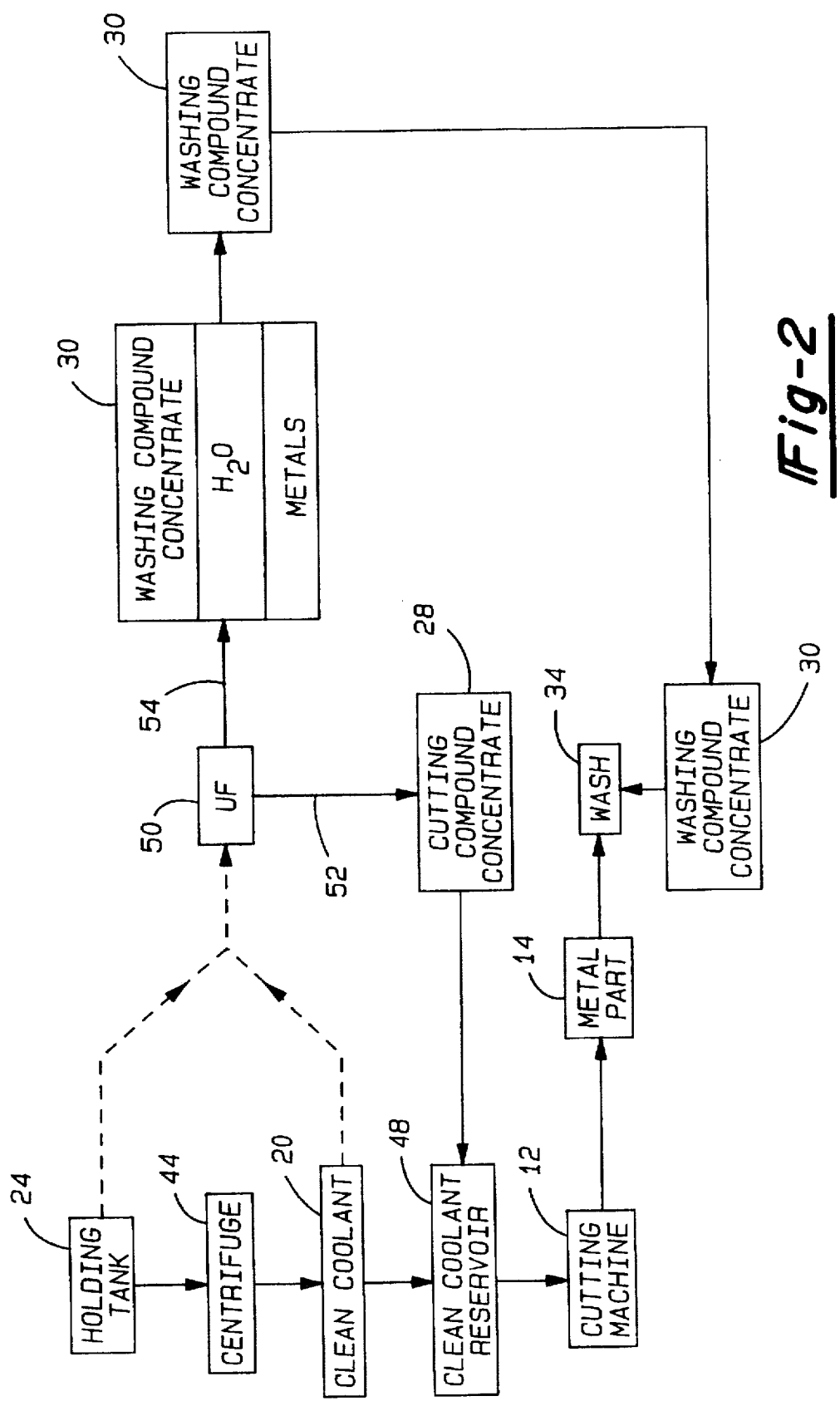
FIG. 2 is a block diagram in which an ultrafiltration step has been added to the recycling process.

With reference now to FIG. 2, an ultrafiltration step 50 can be added to the overall process of recycling and reusing an aqueous degreasing solution 35 as a feeder solution for a dirty coolant solution 22 which is also recycled and reused. After the dirty coolant is centrifuged 44, but before it is sent back into the cutting machines 12 a portion of the clean coolant 20 is sent through an ultrafiltration unit in which the retentate 52 contains primarily water miscible cutting and grinding fluid concentrate 28, and the permeate 54 contains primarily water, metal contaminants, and water miscible washing compound concentrate 30. The metal contaminants come through the ultrafiltration unit 50 in direct proportion to the water miscible washing compound concentrate 30. Removal of an amount of coolant 20 necessary to prevent buildup of metal contaminants and washing compound concentrate 30, and to maintain an equilibrium in the coolant 20 for passage through the ultrafiltration unit 50 is effective in keeping the concentrations of heavy metals and water miscible washing compound concentrate 30 under control before sending the clean coolant 20 back into the cutting machines 12. In the present embodiment as little as 1% of the system volume of coolant 20 is removed per day for passage through the ultrafiltration unit 50.

The permeate 54 containing water, water miscible washing compound concentrate 30, and metal contaminants can then be further purified to remove the metal contaminants. Once separated by ultrafiltration 50 both the retentate 52 and the permeate 54 (absent the metal contaminants) can be reused and recycled back into the cutting machines 12 or wash baths 34 respectively, or sent to waste treatment. The additional step of ultrafiltration 50 allows for the levels of water miscible washing compound concentrate 30 and metal contaminants in the clean coolant solution 20 to be better controlled before the clean coolant 20 goes back into the cutting machines 12, without the necessity of decanting the coolant solution 20 several times a year to keep the coolant solution 20 properly balanced. Alternatively, in the present embodiment, the dirty coolant 22 can be removed from the dirty coolant holding tank 24 and sent through the ultrafiltration unit 50.

As best shown in FIGS. 3 and 3A, the degreasing system 32 includes an automated apparatus for removing coolant solution from the metal parts 14. The metal parts 14 are moved in a parts carrier 102 by a pair of hoists 140,141 sequentially through a series of stations including a loading/ unloading station 104, a wash station 106, a rinse station 108, and then to a drying station 110. The wash station 106 includes a series of three wash baths 34 and skimmers 136 which skim oil from a wash solution. The rinse station 108 includes four rinse baths 36.

The degreasing system 32 utilizes a flow of liquid which begins with chemically purified water 31 from a water supply 33 which is introduced at the rinse station 108 and flows downstream through the wash station 106 where the washing compound concentrate 30 is added to form a wash solution 35. Thus, the metal parts 14 are moved upstream through increasingly clean liquid during the degreasing operation.

The loading station 104 consists of a conveyor 114 which is driven by an electric motor (not shown). Operation of the motor is controlled by a central processing unit 116 to move the parts carrier 102 between a loading position (Shown in FIG. 3) and a staging position. The parts 14 are delivered in metal baskets 118 (shown in FIG. 7) to the loading station 104 from the cutting machine 12. The metal baskets 118 have openings in all sides to permit the wash solution and rinse water to pass through and drain from the baskets 118.

Figure 7:
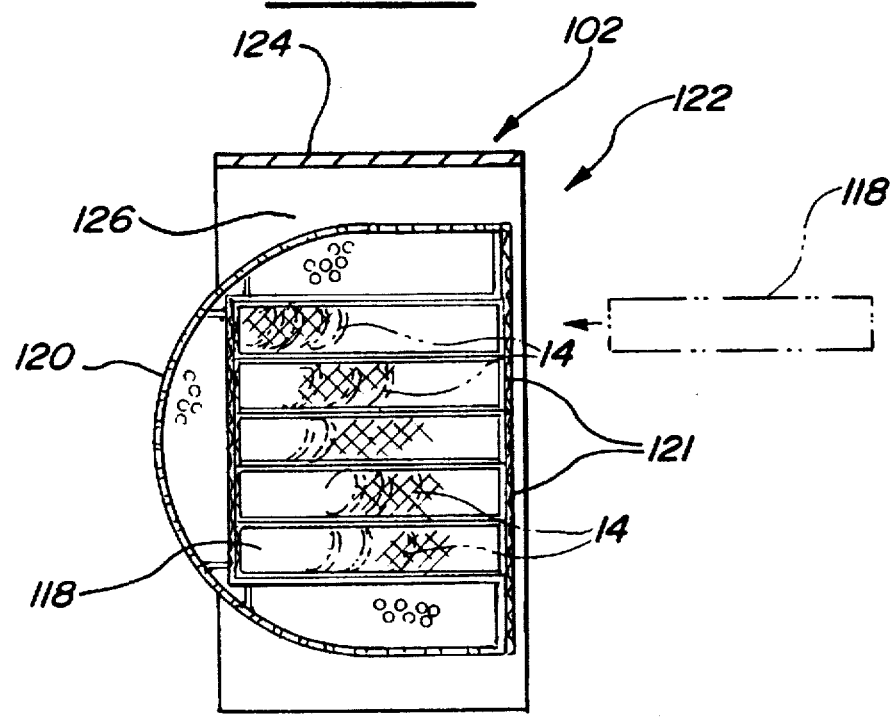
FIG. 7 is a cross-sectional view of a carrier showing baskets in accordance with the invention.

As shown in FIGS. 3 and 7, the carrier 102 includes a drum 120 which is mounted for axial rotation in a frame 122. The drum 120 is formed of a metal lattice which permits liquid to pass through to the baskets 118 and parts 14. The drum 120 has pairs of jaws 121 which move apart to permit access to an interior compartment formed to hold stacks of the metal baskets 118 containing the parts 14. The jaws 121 are moved together to lock the baskets 118 in position within the carrier 102. The frame 122 includes an elongated bridge 124 which extends between a pair of vertical end panels 126. The panels 126 have flat bottom surfaces and are dimensioned to keep the bridge above the surface of the liquid in the wash station 106 and rinse station 108. The drum 120 is mounted between the end panels 126 beneath the bridge 124. A D/C motor 130 is mounted to a top surface of the bridge 124. The motor 130 is connected in a suitable manner such as a belt or drive rods and gear mechanisms to selectively rotate the drum 120.

Figure 6:
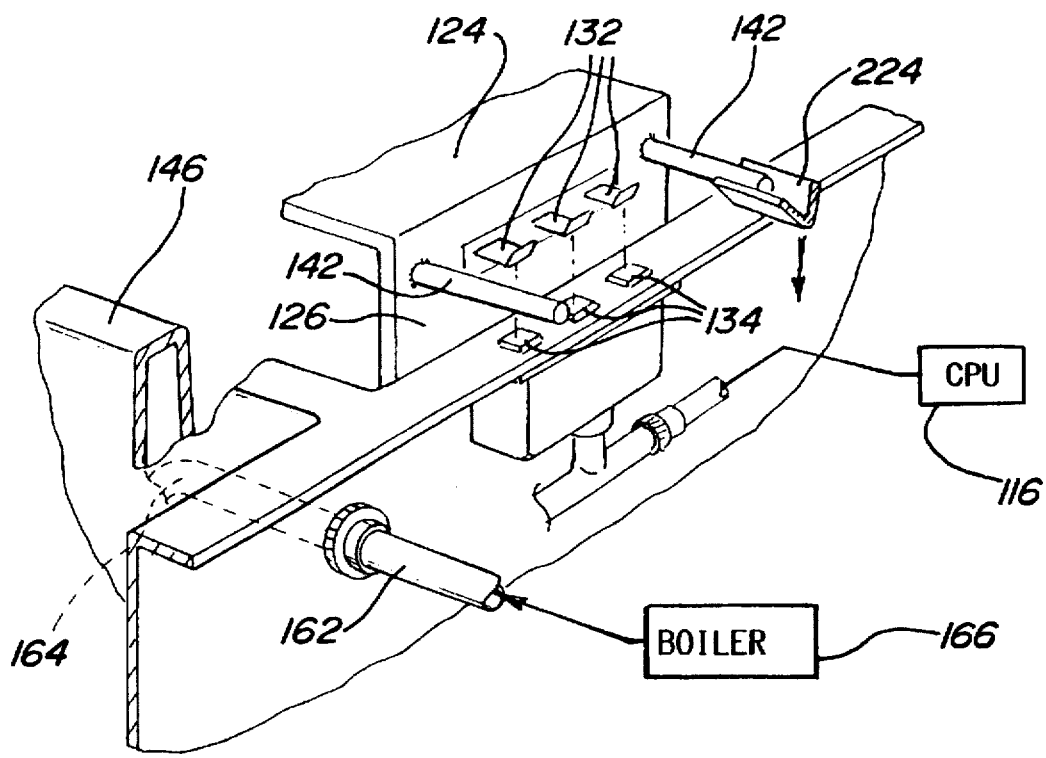
FIG. 6 is a partial perspective view of a portion of a carrier and bath in accordance with the invention.

As best shown in FIG. 6, three metal L-shaped arms 132 extend outwardly from each of the end panels 126 to provide electrical current for the D/C motor. The arms 132 are spring biased to permit movement along a vertical axis and are positioned so as to contact electrical contacts 134 positioned adjacent to each bath 34,36. As will be described below, the motor 130 may be selectively energized to rotate the drum 120 when the carrier 102 is immersed in the baths 34,36 or suspended by either of the two hoists 140,141. A pair of lifting pegs 142 are positioned on each end panel 126, one on either side of the arms 132 for engagement with lift hooks of the hoists 140,141. The baskets 118 are loaded into the parts carrier 102. After the parts carrier 102 is loaded, the conveyor 114 moves the carrier 102 to a staging position adjacent the washing station 106.

Figure 5:
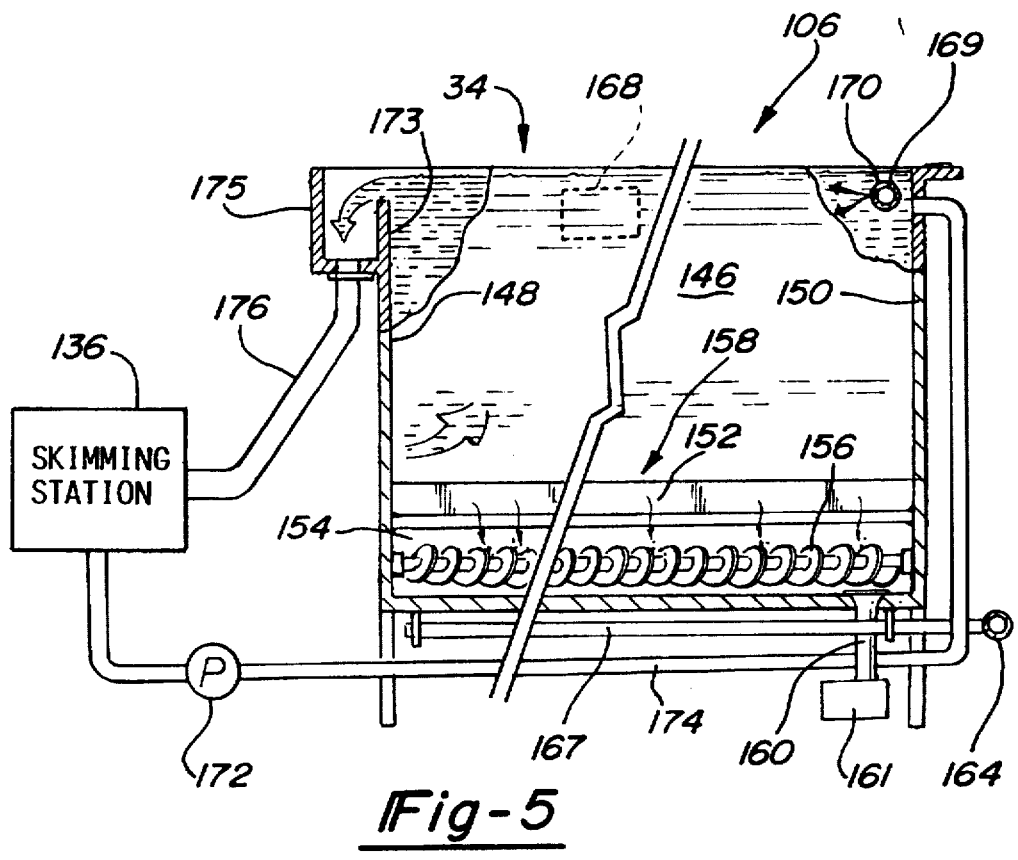
FIG. 5 is a cross-sectional view of a wash bath in accordance with the invention.

As best shown in FIGS. 3 and 5, the wash station 106 includes three identical baths 34. Each of the baths 34 is rectangular, having a pair of sides 146, a pair of ends 148, 150 and a bottom 152. The bottom 152 of each bath 34 has a rectangular channel 154 formed along one side for housing an auger 156. The auger 156 is turned by an electric motor (not shown). The bottom 152 has a central portion 158 which slopes downwardly towards the channel 154 to deliver any metal flakes or debris from the parts 14 into the channel 154. The auger 156 carries the debris through the channel 154 to a drain 160 having a trap 161 for capturing the debris. The trap 161 is a removable basket for disposing of the debris.

As shown in FIGS. 3, 5 and 6, a steam pipe 162 delivers steam to the sides 146. A conduit 164 delivers the steam from a boiler 166 to a heating coil 167 positioned beneath each tank 34,36 to heat liquid in the tanks 34,36. The water is heated to approximately 160° F. Ultrasonic wave generators 168 are mounted between the sides 146 of the baths to produce waves which move the liquid between the parts 14 in the baskets 118 to permit the fluid in the tanks 34,36 to pass fully around the parts 14. This facilitates cleaning of the parts 14 and removal of residual debris. The ultrasonic generators 168 may be of any conventional type.

As shown in FIGS. 3 and 5, a horizontally aligned manifold 169 having a number of jets 170 is mounted near the top of each tank 34,36. The liquid is sprayed through the jets 170 into the tank 34,36. The washing solution 35 is delivered to the manifold 169 by a pump 172 and inflow conduit 174 from an associated skimmer 136. The washing solution is permitted to flow over a weir 173 into a collector 175 located at one end 148 of the tank 34,36 from which it is gravity fed through an outflow conduit 176 back to the skimmer 136.

Figure 4:
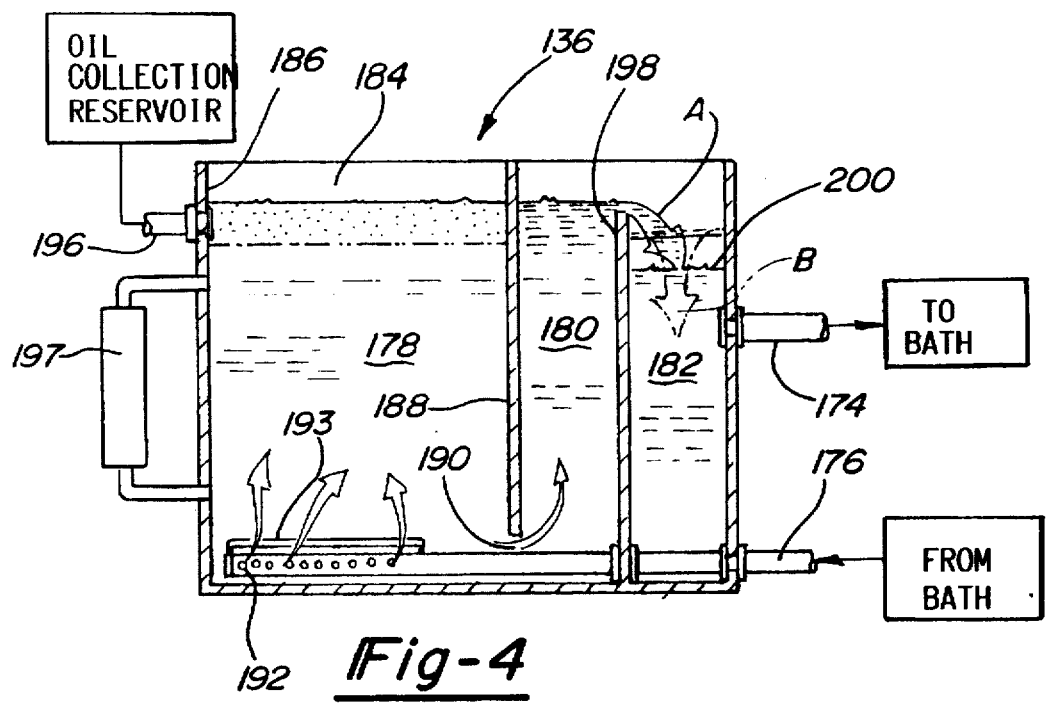
FIG. 4 is a cross-sectional view of a skimmer in accordance with the invention.

As shown in FIGS. 3 and 4, each of the skimmers 136 is a rectangular tank having a main chamber 178, an intermediate chamber 180 and a collector 182. The main chamber 178 is defined by a pair of side walls 184, an outer end wall 186 and an interior wall 188 which extends towards an opening 190 at the bottom of the tank. The out flow conduit 176 delivers fluid from the baths through a series of large apertures 192. The fluid is delivered by gravity into the main chamber 178 and is allowed to flow into the tank through the apertures 192 below a baffle 193 to prevent turbulence so that any tramp oil in the liquid will rise to the surface of the liquid of the main chamber 178 where it will float to be collected by a skimming device. The skimming device may be of any suitable type for removing oil. It may be performed by hand or a mechanical device as known in the art and may be used to siphon oil from the top of the main chamber 178 and delivered by a conduit 196 to a reservoir. The liquid is circulated through a filter 197 to remove particulate matter from the liquid.

The liquid flows from the main chamber 178 through the opening 190 into the intermediate chamber 180 formed between the interior wall 188 and a primary weir 198 which is lower than the interior wall 188. The liquid (shown by arrow A) is permitted to cascade over the weir 198 into the collector 182 from which it is delivered to the inflow conduit 174 and pump 172 for delivery to an associated bath 34,36. A secondary weir 200 is formed in each side wall 184 of the collector 182 between collectors of adjacent skimmers 136 to permit a portion of the liquid to pass downstream to the collector 182 of the adjacent skimmer (shown by arrow B). Thus, there is a downstream counterflow from 136d to 136c to 136b and 136a as shown in FIG. 3A when the rinse water flows to skimmer 136c it is mixed with the aqueous degreasing solution 35, from wash bath 34c. The wash solution is, thus composed of the rinse water and approximately 2 to 7% and preferably 3 to 4% of the washing compound concentrate 30. The concentration of washing compound concentrate 30 is monitored and controlled in each wash bath 34 on a daily basis. It has been found to be advantageous to maintain the concentration of the first two baths 34a,34c that the parts 14 enter at 4%, and the concentration of the third bath 34c at 3%.

As shown in FIG. 3A, the wash solution 35 is delivered from the wash bath 34c to a skimmer 136c and then to the skimmer 34b. Where it is recirculated to wash bath 134b, the wash solution continues downstream to skimmer 136a and to the first wash bath 34a. The used aqueous dispensing solution 42 is delivered through a conduit 202 from the skimmer 136a to the dirty coolant tank 24 for use as feedstock in the coolant solution 20.

The rinse station 108 includes four baths 36, one bath 36 is separated from the other rinse baths by a holding table 204. Each of the rinse baths 36 is generally rectangular shaped, having the same dimensions as the wash baths 34. However, the rinse tanks 36 do not include a channel 154 and auger 156 at the bottom as do the wash tanks 34. Steam is delivered from the conduit 164 to the bottom of the tanks 36 in order to heat the rinse water 31. A suitable temperature is approximately 155° F. A weir 208 is formed at one end to permit the rinse water 31 to flow from the bath 36 into a collector 210 from which it is delivered by a conduit 212 and pump 211 to the manifold 169 having jets 170 to the downstream tank. The rinse water 31 is introduced from the water supply 33 through a flow regulator (not shown) into the fourth rinse bath 36 at a rate of between 0.1 and 1.0 gallon per minute. The rate in the preferred embodiment is 1.0 gallon per minute. However, the rate of flow of liquid through the system decreases to approximately 0.5 gpm because of evaporation from the baths. Thus, the flow rate of liquid is lower in each downstream bath 34,36.

As described above, the rinse water 31 cascades downstream through each of the four rinse baths 36, weirs 208 and collector 210 to the most upstream skimmer 36 where it is then introduced into the third or most upstream wash bath where it is mixed with the washing compound concentrate 30.

As shown in FIGS. 3, 3A, and 5, the drying station 110 incudes three rectangular drying chambers 213 having the same dimensions as the wash and rinse baths 34,36. The drying chamber 213 are heated by a heating coil 167 connected to the conduit 164 to receive steam from the boiler 166. The carrier 102 may be thus placed in a chamber 213 and receive heat from the coil 167 to dry the parts 14 inside the drum 120.

In the event that the degreasing system 32 needs servicing, the rinse water 31 and washing solution 32 may be pumped into two tanks 214, 215 for storage during service.

The two hoists 140, 141 each run on a pair of overhead rails 216. The operation of the hoists 140, 141 is controlled by the CPU 116 which both controls the movement of carriages 218 along the rails 216 and operates chains 222 to raise and lower a lifting plate 220. As shown in FIGS. 3 and 6, each of the lift plates 220 has a pair of V-shaped receptacles 224 which extend inwardly. The receptacles 224 are spaced apart and positioned to receive the lifting pegs 142 of the carrier 102. Electrical contacts are provided on the carriage 218 to connect with the arms 132 on the carrier 102 to power the electric motor 130 to rotate the drum 120. The hoists 140,141 are operable to raise and lower the carrier 102 to and from the baths 34,36 and to rotate the drum 20 when the 120 are in a raised position. The first of the hoists 140 is a wash hoist movable between the staging area of the loading station 104 and the holding station 204. The rinse hoist 141 moves between the first rinse bath and the drying station 110.

OPERATION

Parts 14 are delivered to a carrier 102 at the loading station 104 where the baskets 118 are loaded into the drum 120. After being loaded, the jaws 121 of the drum 120 are closed and the carrier 102 is moved along the conveyor 114 to the staging area. The carrier 102 is then lifted by the wash hoist 140 and delivered to the first wash bath 34a. The wash bath 34a (FIG. 3A) contains a washing solution 35 which is heated to a temperature of approximately 160°. The parts 14 are subjected to ultrasonic agitation and may be rotated within the bath 34 by turning the drum 120. After approximately one minute in the first bath 34a, the carrier 102 is lifted by the wash hoist 140 and moved to the second and third wash baths 34b and 34c. The carrier 102 remains in each bath 34 for approximately one minute before it is moved onto the subsequent bath 34. After passing through the third wash bath, the carrier is lifted by the wash hoist 140 and deposited at the holding station 204.

The rinse hoist 141 then lifts the carrier 102 into the first of the rinse baths 36. The carrier 102 is then subsequently positioned in the second, third, and fourth rinse baths 36. The carrier 102 is held in each bath 36 for approximately 15 to 20 seconds. After completing the four rinse baths 36, the rinse hoist 141 moves the carrier 102 to one of the drying chambers 213 while the hoists 140, 141 move other carriers 102 through the rinse and wash baths 34,36. The carrier 102 is permitted to remain in the drying chamber 213 nearly three full wash and rinse cycles, or approximately 15 minutes. After the carrier 102 has completed a drying period, it is removed from the drying chamber 213 by the rinse hoist 141 and is returned to the holding station 204. The wash hoist 140 then moves the carrier 102 to the loading area of the loading station 104 where the baskets 118 are unloaded. The timing of the movement of the carriers 102 may be programmed such that the carriers 102 are being continuously and progressively moved through the various baths 34,36 and returned to the loading station 104. The movement of the carriers through the degreasing system 32 is controlled by the CPU 116.

When fully lifted, the drum 120 of the carrier 102 may be rotated to drain the wash solution 35 or rinse water 31 from the drum 120 before moving on to the next bath 34,36. However, if the parts 14 are required to have a smooth finish, then the drum 120 is not rotated. Additionally, the rotation of the drum 120 can be controlled to provide either a continuous rotation or a staggered rotation where the drum 120 moves 90° and is held for a period of time before rotating another 90°. One of the arms 132 provides electrical contact for continuous rotation, a second for staggered and a third is a ground.

The present invention, therefore, provides for a coolant and aqueous degreasing reclamation process for the metal finishing industry in which the used aqueous degreasing solution is recycled and reused into the coolant solution which is itself recycled and reused. As a result, the use of ozone depleting or carcinogenic substances is avoided and the need for sending used solutions into waste water is greatly diminished. Having described my invention, many modifications thereto will become apparent to those skilled in the art to which it pertains without deviation from the spirit of the invention as defined by the scope of the appended claims.

We claim:

1. A method for recycling a coolant solution for use in cooling raw metal being cut in a metal cutting machine, said method including the steps of:

cutting raw metal in a metal cutting machine while directing a stream of a coolant solution thereonto, said coolant solution comprising a supply of a water miscible, cutting fluid concentrate dispersed in water, whereby a part is produced from said metal and a volume of used coolant solution is generated;

conveying said part to a degreasing station which operates to wash said part in a degreasing solution which comprises a supply of a water miscible washing compound concentrate dispersed in water, whereby a cleaned part is produced and a volume of used degreasing solution is generated;

cleaning said volume of used coolant solution so as to remove insoluble oils and contaminants therefrom;

cleaning said volume of used degreasing solution so as to remove insoluble oils and contaminants therefrom; and mixing said used coolant solution, said used degreasing solution and sufficient cutting fluid concentrate so as to regenerate the coolant solution having said supply of said cutting fluid concentrate therein.

2. A method as in claim 1, wherein said used coolant solution and said used degreasing solution are mixed together prior to being cleaned, and wherein the steps of cleaning said used coolant solution and said used degreasing solution are carried out at the same time, on said mixed solutions.

3. A method as in claim 2, wherein said cutting fluid concentrate is added to said mixed solutions after they have been cleaned.

4. A method as in claim 1, wherein the step of cleaning said volume of used coolant solution and the step of cleaning said volume of used degreasing solution are carried out by use of a centrifuge.

5. A method as in claim 1, wherein said coolant solution comprises, by weight, 2–7% of said cutting fluid concentrate.

6. A method as in claim 5, wherein said coolant solution further includes, by weight, 1–2% of said washing compound concentrate.

7. A method as in claim 1, wherein said degreasing solution includes, by weight, 2–6% of said washing compound concentrate.

8. A method as in claim 1, wherein the step of conveying said part to a degreasing station comprises conveying said part to a station which further operates to rinse the part in water, after said part has been washed in said degreasing solution, and wherein at least a portion of the water in which the part has been rinsed is subsequently mixed into the degreasing solution.

9. A method as in claim 1, wherein the step of cleaning said used degreasing solution includes the step of filtering at least a portion of said used degreasing solution through an ultra filter so as to remove at least a portion of the washing compound concentrate, and a portion of metal contaminants from said used degreasing solution.

10. A method as in claim 1, wherein all of said used degreasing solution is mixed with said used coolant solution.

* * * * *